Jan. 3, 1950     R. L. TWEEDALE     2,493,510
POWER TRANSMISSION
Filed April 8, 1947
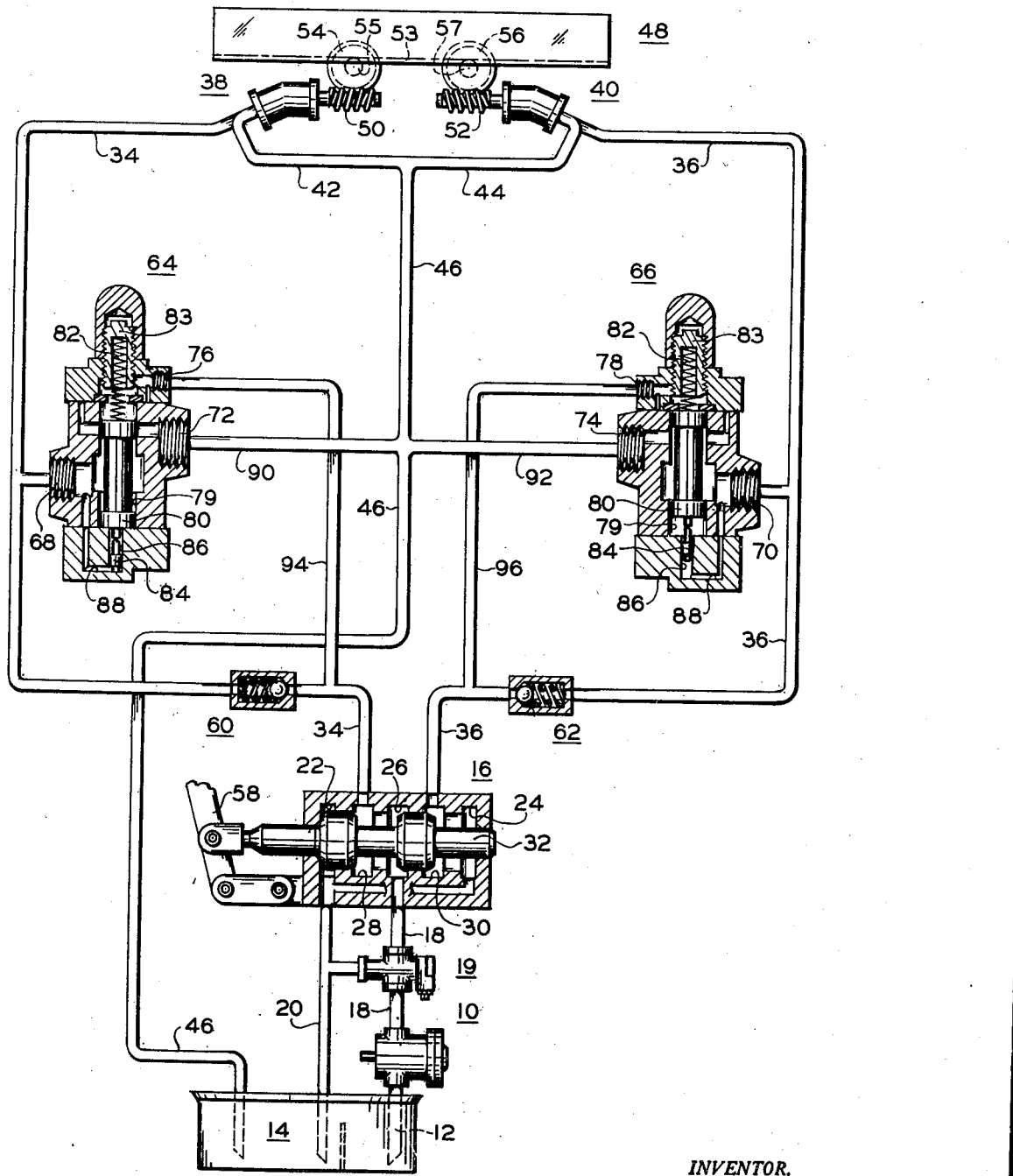
INVENTOR.
Ralph L. Tweedale Patented Jan. 3, 1950

2,493,510

UNITED STATES PATENT OFFICE 2,493,510

POWER TRANSMISSION

Ralph L. Tweedale, Birmingham, Mich., assignor to Vickers Incorporated, Detroit, Mich., a corporation of Michigan Application April 8, 1947, Serial No. 740,160

13 Claims. (Cl. 90—22)

This invention relates to power transmissions, particularly to those of the type comprising two or more fluid pressure energy translating devices, one of which may function as a pump and another as a fluid motor.

The invention is more particularly concerned with a transmission adapted to drive a load device forward and reverse. One of the features to be considered in judging the quality of a reversible transmission is its lag or dwell occurring at the point of reversal followed by a sudden resumption of movement in the opposite direction. One of the causes of such erratic operation is due to clearance in the mechanical driving linkage and is commonly termed backlash.

Regardless of the type of mechanical driving linkage used whether it be gearing, levers, cranks, or a combination of elements, the elimination of backlash is an inherent problem which has been substantially reduced by accurate machining and closer fits. Nevertheless, in time, wear increases the clearances and the trouble from backlash gradually develops.

When a driving linkage is reversed, such as between a gear and pinion, the driving contact is shifted from one side of the gear tooth to the other. If both sides of the tooth are maintained in driving contact at all times, then no backlash would be present. However, as the thickness of that tooth is gradually reduced due to wear, the amount of backlash is increased in proportion.

Therefore, in order to eliminate backlash, it is necessary to maintain the driving surfaces of any reversible driving linkage in contact at all times irrespective of the direction of drive and regardless of mechanical clearance. In the present invention, this is accomplished by providing two independent hydraulic motors adapted to drive the load device in opposite direction. The hydraulic transmission adapted to operate the motor employed to drive the load device in the selected diretcion automatically maintains an opposing hydraulic force of a smaller amount on the other motor thereby permitting the load device to be driven by the dominating motor. Actually the selected motor is driven hydraulically by pressure fluid from the source to operate the load device which in turn drives the other motor as a pump. By restricting the discharge from that motor functioning as a pump, a load is maintained thereon at all times and the normal driving contact surfaces of the mechanical linkage are constantly in mesh thereby eliminating all backlash.

The general object of this invention is to provide a reversible transmission adapted to automatically eliminate all backlash from any mechanical linkage employed for driving a load device.

Another object is to provide a reversible transmission adapted to automatically take up the wear in any type of driving linkage and eliminate all backlash.

It is also an object to provide a reversible transmission in which the backlash is eliminated and always taken up in the same direction.

Still another object is to provide a reversible transmission employing a separate motor for driving a load device in each direction and pressure control means for maintaining each motor in independent driving contact regardless of the direction of rotation.

Further objects and advantages of the present invention will be apparent from the following description, reference being had to the accompanying drawing wherein a preferred form of the present invention is clearly shown.

In the drawing:

The single figure is a diagrammatic view of a reversible power transmission system incorporating a preferred form of the present invention.

The transmission illustrated includes a pressure fluid supply source comprising a supply pump 10 connected by suction line 12 to tank 14, adapted to deliver operating fluid to the four-way valve 16 through conduit 18. A relief valve 19 is located in conduit 18 and connected to a tank or drain conduit 20 which connects the tank ports 22 and 24 of four-way valve 16 to tank 14. Pressure fluid from conduit 18 enters four-way valve 16 at supply port 26 and may be selectively directed to either service port 28 or 30 by spool valve 32. Pressure conduits 34 and 36 connect ports 28 and 30 of four-way valve 16 to the pressure ports of motor-pump power units 38 and 40, respectively. The tank ports of units 38 and 40 are connected by branch conduits 42 and 44, respectively, to tank conduit 46.

The numeral 48 indicates the reciprocating table or load device which is driven by motors 38 and 40 through reversible worms 50 and 52 and wheels 54 and 56, respectively, connected to rack 53 and pinions 55 and 57. The direction of travel of the table 48 is controlled by spool valve 32 which is manually shifted by lever 58. When the operating pressure fluid is directed to either motor-pump power unit to operate it as a fluid motor and drive the table 48, the other unit will be driven by the table and operated as a pump. In this respect, tank conduit 46 extends to tank 14 and together with branch conduits 42 and 44 perform the dual function of operating as a discharge conduit to tank with respect to the unit functioning as a fluid motor or as a suction line with respect to the unit functioning as a pump. In the latter case the pressure conduit 34 or 36 becomes the discharge line for the pump and would normally return fluid through the four-way valve to tank. However, both pressure conduits are blocked to return flow by check valves 60 and 62.

Counterbalance or back-pressure valves 64 and 66 are provided with inlets 68 and 70, outlets 72 and 74 and drain connections 76 and 78 which communicate with a central bore 79. Each counterbalance valve is provided with a spool valve 80 located in bore 79. The spool 80 is biased into a closed position by spring 82 and the spring tension varied by means of adjusting screw 83. An operating piston 84 located in cylinder 86 communicates with inlet 70 by means of passage 88. The outlets 72 and 74 are connected by conduits 90 and 92 to the tank conduit 46. The drain connection 76 is connected to the pressure conduit 34 at a point intermediate the four-way valve 16 and the check valve 60 by means of conduit 94. Similarly, drain connection 78 is connected to pressure conduit 36 at a point between the check valve 62 and fourway valve 16 by means of conduit 96.

In operation, with the four-way valve 16 in its left position as illustrated in the drawing, operating pressure fluid is directed from port 26 to port 28 and thence to motor 38 by conduit 34. At the same time, operating pressure in conduit 34 is communicated to the top of spool 80 of counterbalance valve 64 through drain conduit 94. Thus, the communication through counterbalance valve 64 via inlet 68, bore 79, outlet 72, and thence by conduits 90 and 46 to tank 14, is blocked.

Operating pressure fluid drives the motor 38 which moves the table or load device 48 to the right by means of the worm 50 and wheel 54 rotating the pinion 55 on rack 53. The movement of the table 48 and rack 53 rotates the pinion 57 and in turn the wheel 56 and worm 52 to drive the motor-pump power unit 40 as a pump. The pump 40 is connected so as to obtain its suction through conduit 44 from the motor discharge conduit 42 or tank conduit 46. Thus, the pump 40 discharge will be delivered to pressure port or conduit 36 and would normally be returned to tank via port 30 and 24 of four-way valve 16 and conduit 20. However, check valve 62 blocks conduit 36 and directs the pump 40 discharge to the inlet 70 of back pressure valve 66.

In its non-operative position, the spool 80 of valve 66 would be biased by spring 82 to its lower position (similar to that shown in valve 64), thus blocking the discharge from pump 40 until the pressure at inlet 70 is sufficient to raise the piston 84 and spool 80 against the force of spring 82. The spring tension may be adjusted by means of screw 83 and thus the back-pressure at which the counterbalance valves will open may be selectively varied to produce the desired back-pressure on the power unit operating as a pump (40 in the drawing).

When the four-way valve 16 is shifted to the right, operating pressure fluid will be directed through conduit 36 to power unit 40, to operate it as a motor and drive the table 48 to the left. At the same time, operating pressure is communicated through conduit 96 to the top of spool 80 thereby moving the spool downward and blocking the passage through the counterbalance valve 66 so long as motor 40 is driving the table 48.

Therefore, conduits 34 and 36 are connected to the pressure port of the respective power units 38 and 40, and are constantly maintained under operating pressure as a motor or by back-pressure as a pump. In all cases, both the driving torque and the back-pressure torque are exerted in the same direction by each power unit whereby the same driving surfaces are in constant contact at all times thereby eliminating backlash.

It will thus be seen that the present invention is a novel reversible transmission adapted to eliminate all backlash from the transmission and mechanical linkage connected to a load device regardless of wear or direction of drive. This is accomplished by means of two independent hydraulic motor-pump power units adapted to selectively drive a load device in either direction. The power units are so controlled that while one acts as a motor to drive the load device, the other is driven by the load device as a pump to slightly oppose the motion of the first unit and thereby maintain each power unit in constant driving mesh with the load device and in the same direction regardless of the direction of travel of the load device.

While the form of embodiment of the invention as herein disclosed constitutes a preferred form, it is to be understood that other forms might be adopted, all coming within the scope of the claims which follow.

What is claimed is as follows:

1. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a source of fluid pressure and means for directing fluid therefrom to either the first motor or the second motor, and a counter-balance valve for maintaining a back pressure against the motor being driven as a pump and taking up the backlash of the gearing.

2. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a source of fluid pressure and means for directing fluid therefrom to either the first motor or the second motor, and a counter balance valve connected to the discharge side of a motor for maintaining a back pressure against the motor when said motor is being driven by the load device as a pump, and means for blocking the valve and rendering it inoperative during the period the motor is operated by the pressure fluid source.

3. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a source of fluid pressure and means for directing fluid therefrom to either the first motor or the second motor, and means for restricting the discharge passage of either motor when being operated as a pump to impose a back pressure on that motor while operating as a pump and eliminate backlash by maintaining the gearing in constant driving mesh in one direction regardless of the direction the load device is being driven.

4. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a source of fluid pressure and pressure conduits in combination with a directional valve for selectively directing operating fluid therefrom to the pressure ports of either the first or second motor, conduits connecting the other port of each motor to tank, a back pressure valve adapted to maintain a pressure at its inlet less than the pressure of the fluid at the source, and means for directing the discharged fluid from the motor being operated by the load device as a pump to the inlet of the back pressure valve.

5. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a source of fluid pressure and means for directing fluid therefrom to either the first motor or the second motor, for selective operation of the load device in either direction and to both motors simultaneously in the neutral position, and a counterbalance valve for maintaining a back pressure against the motor being driven as a pump and taking up the backlash of the gearing.

6. In a hydraulic power transmission system for driving a load device in either direction, the combination of a first fluid motor geared to the load device to drive the load device in one direction and be driven by the load device as a pump in the opposite direction, a second fluid motor geared to the load device to drive the load device in the opposite direction and be driven by the load device as a pump in the one direction, a source of fluid pressure and pressure conduits in combination with a directional valve for selectively directing operating fluid therefrom to the pressure ports of either the first or second motor, conduits connecting the other port of each motor to tank, a back pressure valve provided with inlet and outlet connections and adapted to maintain a pressure at its inlet less than the pressure of the fluid at the source, the inlet of the back pressure valve being connected to the pressure port of the motor and the outlet being connected to tank, and means for diverting the discharge from the motor, operating as a pump to the inlet of the back pressure valve.

7. In a hydraulic power transmission system connected to a source of pressure fluid for driving a load device in either direction, the combination of two fluid motor-pump power units each mechanically coupled to the load device and adapted to drive or be driven by the load device, pressure conduits connecting the source of pressure fluid to the pressure port of each power unit, conduits connecting the other port to tank, a directional valve for selectively connecting either pressure conduit to the source of pressure fluid and the other pressure conduit to tank, and means associated with the pressure conduits adapted to permit free flow of pressure fluid from the source to the power unit but restrict the flow in the reverse direction thereby maintaining a positive pressure on the pressure port of the power unit when operating as a pump.

8. In a hydraulic power transmission system for driving a load device in either direction, the combination of a source of pressure fluid, a hydraulic motor-pump power unit mechanically coupled to the load device and adapted to drive the device in one direction and be driven by the device in the opposite direction, a second hydraulic motor-pump power unit mechanically coupled to the load device and adapted to drive the load device in the reverse direction and be driven by the load device in the opposite direction, pressure conduits connecting the source of pressure fluid to the pressure port of each motor-pump power unit, conduits connecting the other port to tank, means for selectively directing pressure fluid from the source through either pressure conduit to its respective power unit and connecting the other pressure conduit to tank, and means associated with the pressure conduits adapted to permit free flow of pressure fluid from the source to the power unit but restrict flow in the reverse direction thereby maintaining a positive pressure at the pressure port of the power unit when operating as a pump.

9. In a hydraulic power transmission system for driving a load device in either direction, the combination of a source of pressure fluid, a hydraulic motor-pump power unit mechanically coupled to the load device and adapted to drive the device in one direction and be driven by the device in the opposite direction, a second hydraulic motor-pump power unit mechanically coupled to the load device and adapted to drive the load device in the reverse direction and be driven by the load device in the opposite direction, pressure conduits connecting the source of pressure fluid to the pressure port of each motor-pump power unit, conduits connecting the other port to tank, means for selectively directing pressure fluid from the source through either pressure conduit to its respective power unit and connecting the other pressure conduit to tank, two back pressure valves provided with inlets connected to the pressure ports of each motor-pump unit and outlets connected to tank, and a check valve in each pressure conduit for blocking return flow from the power unit driven by the load device as a pump and diverting the discharge therefrom to the back pressure valve thereby loading the power unit and eliminating backlash in the mechanical coupling to the load device.

10. In a hydraulic power transmission system for driving a load device in either direction, the combination of a source of pressure fluid, a hydraulic motor-pump power unit mechanically coupled to the load device and adapted to drive the device in one direction and be driven by the device in the opposite direction, a second hydraulic motor-pump power unit mechanically coupled to the load device and adapted to drive the load device in the reverse direction and be driven by the load device in the opposite direction, pressure conduits connecting the source of pressure fluid to the pressure port of each motor-pump power unit, conduits connecting the other port to tank, means for selectively directing pressure fluid from the source through either pressure conduit to its respective power unit and connecting the other pressure conduit to tank, two back pressure valves provided with inlets connected to the pressure ports of each motor-pump unit and outlets connected to tank, and a check valve in each pressure conduit limiting the direction of flow from the pressure fluid source to the motor-pump power unit, a conduit connecting the pressure port of the motor-pump power unit to tank, and a back pressure valve in said last mentioned conduit for restricting the flow therethrough and maintaining a positive pressure on the pressure port of the power unit whn that unit is being driven by the load device as a pump.

11. In a hydraulic power transmission system for driving a load device in either direction, the combination of a source of pressure fluid, a hydraulic motor-pump power unit mechanically coupled to the load device and adapted to drive the device in one direction and be driven by the device in the opposite direction, a second hydraulic motor-pump power unit mechanically coupled to the load device and adapted to drive the load device in the reverse direction and be driven by the load device in the opposite direction, pressure conduits connecting the source of pressure fluid to the pressure port of each motor-pump power unit, conduits connecting the other port to tank, means for selectively directing pressure fluid from the source through either pressure conduit to its respective power unit and connecting the other pressure conduit to tank, two back pressure valves provided with inlets connected to the pressure ports of each motor-pump unit and outlets connected to tank, and a check valve in each pressure conduit limiting the direction of flow from the pressure fluid source to the motor-pump power unit, a conduit connecting the pressure port to the motor-pump power unit to tank, and a back pressure valve in said last mentioned conduit for restricting the flow therethrough and maintaining a positive pressure on the pressure port of the power unit when that unit is being driven by the load device as a pump, and means responsive to fluid pressure from the source for blocking the back-pressure valve connected to the power unit being hydraulically operated as a motor.

12. In a hydraulic power transmission system for driving a load device in either direction, the combination of a source of pressure fluid, a hydraulic motor-pump power unit mechanically coupled to the load device and adapted to drive the device in one direction and be driven by the device in the opposite direction, a second hydraulic motor-pump power unit mechanically coupled to the load device and adapted to drive the load device in the reverse direction and be driven by the load device in the opposite direction, pressure conduits connecting the source of pressure fluid to the pressure port of each motor-pump power unit, conduits connecting the other port to tank, means for selectively directing pressure fluid from the source through either pressure conduit to its respective power unit and connecting the other pressure conduit to tank, two back pressure valves provided with inlets connected to the pressure ports of each motor-pump unit and outlets connected to tank, and a check valve in each pressure conduit limiting the direction of flow from the pressure fluid source to the motor-pump power unit, a conduit connecting the pressure port of the motor-pump power unit to tank, and a pressure actuated back-pressure valve in said last mentioned conduit adapted to be opened by a predetermined pressure at the pressure port of the power unit when the power unit is being driven by the load device as a pump and adapted to be closed by pressure at the pressure port when the power unit is being hydraulically driven as a motor.

13. In a transmission for driving a load device in both directions, a fluid pump forming a source of power, a power input unit adapted to drive the load device in one direction and be driven thereby in the opposite direction, a power absorption unit driven by the load device and adapted to drive the load device in the opposite direction, means for selectively supplying power from the source to either unit driving the load device, and automatic flow restricting valve means connected between the power units and the source for imposing a braking effect on the unit driven by the load device whereby both units are maintained in driving contact with the load device in their proper respective directions at all times.

RALPH L. TWEEDALE.

REFERENCES CITED

The following references are of record in the file of this patent:

UNITED STATES PATENTS

| Number | Name | Date |
|---|---|---|
| 2,236,256 | Allard | Mar. 25, 1941 |
| 2,267,696 | Groene et al. | Dec. 23, 1941 |